(12) United States Patent
Yan

(10) Patent No.: US 7,944,969 B2
(45) Date of Patent: May 17, 2011

(54) METHOD AND SYSTEM FOR SAMPLING VIDEO DATA

(75) Inventor: Yong Yan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1148 days.

(21) Appl. No.: 11/620,540

(22) Filed: Jan. 5, 2007

(65) Prior Publication Data

US 2008/0165857 A1 Jul. 10, 2008

(51) Int. Cl.
*H04N 7/12* (2006.01)
(52) U.S. Cl. ............... 375/240.03; 375/240.21
(58) Field of Classification Search ............ 375/240.21, 375/E7.135, E7.137, E7.139, E7.14, E7.154, 375/E7.186, E7.188, E7.252, 240.02, 240.03; 348/27, 405, E7.008
See application file for complete search history.

(56) References Cited

U.S. PATENT DOCUMENTS

| | | | | |
|---|---|---|---|---|
| 5,561,660 | A * | 10/1996 | Kotowski et al. | 370/215 |
| 7,738,593 | B2 * | 6/2010 | Howard | 375/296 |
| 7,760,960 | B2 * | 7/2010 | Yan et al. | 382/261 |
| 2002/0090028 | A1 * | 7/2002 | Comer et al. | 375/240.2 |
| 2005/0105617 | A1 * | 5/2005 | Chono | 375/240.16 |
| 2006/0110065 | A1 * | 5/2006 | Huang et al. | 382/275 |
| 2008/0069239 | A1 * | 3/2008 | Yan | 375/240.21 |
| 2008/0069469 | A1 * | 3/2008 | Yan et al. | 382/261 |

* cited by examiner

*Primary Examiner* — Tesfaldet Bocure
*Assistant Examiner* — Lawrence B Williams
(74) *Attorney, Agent, or Firm* — Dillon & Yudell LLP

(57) ABSTRACT

A method and system for sampling video data uses re-sampling filters having lengths optimized relative to a quantization parameter of video processing. The method uses modeling of an optimal length of the re-sampling filter as a function of the quantization parameter to derive empirical formulas and a look up table for optimal lengths of re-sampling filters. The resulting re-sampling filters are selectively adapted for sampling video data having different bit rates.

20 Claims, 3 Drawing Sheets

| LOOK UP TABLE FOR DETERMINING OPTIMAL FILTER LENGTH ||
| VALUE OF QUANTIZATION PARAMETER | OPTIMAL FILTER LENGTH |
| --- | --- |
| 0-20 | 4 |
| 21-32 | 6 |
| 33-38 | 8 |
| 39-44 | 10 |
| 45-51 | 12 |

310     320

300

METHOD AND SYSTEM FOR SAMPLING VIDEO DATA

BACKGROUND OF THE INVENTION

1. Field of the Invention

The present invention generally relates to the field of digital image processing and, in particular, to methods and systems for processing scalable video data.

2. Description of the Related Art

The amounts of raw digital information included in high-resolution video sequences are massive and tend to increase along with advances in performance of video cameras. In order to reduce the amount of video data that must be transmitted to or processed by an end user system, various digital processing methods are used to compress the video data. In addition, many video applications require that, within a single stream, the video data is available at various resolutions. Therefore, compression and de-compression of video sequences are frequently performed during transmission or processing of video information; however, each of such conversions may degrade, objectively or subjectively, quality of visual information contained in the processed video data.

One of methods of scalable video coding (SVC) is spatial scalability technique (SSTs) used in industry-adapted video compression and communication standards, for example, MPEG-4, H.264 extension, and other standards. Using the SST, raw video data is divided into a low-resolution base layer and one or more enhancement layers. The base layer provides a lower quality video signal, while the enhancement layers contain additional information that can enhance the image corresponding to the base layer. Each enhancement layer can be combined with the base layer to form a video signal providing quality of visualization adapted to the requirements of a particular application.

Utilization of the SSTs requires development of low-pass re-sampling digital filters facilitating multiple layer coding, or image compression, of the high-resolution video data. Generally, image compression is controlled using quantization parameters, which define compression ratios of sampled, or compressed, video sequences and, as such, quality of reconstructed (i.e., decompressed) images.

In one example illustrating a need in sampling rate conversions using the SST, raw video data is down-sampled to reduce its resolution and then the data is encoded to produce the base layer. The base layer is decoded and reconstructed video data is up-converted to produce prediction data for the enhancement layer. Then, the prediction data is subtracted from the raw video data to produce residual data that, in an enhancement encoder, is encoded to form an enhancement layer.

During sampling rate conversions using the SST, conventional compression algorithms use re-sampling filters having fixed length and coefficients without considering quantization parameters, which may lead to unsatisfactory results. For example, subjective quality of some images may be too low. Therefore, despite the considerable effort in the art devoted to development of efficient methods and apparatus for sampling video data, further improvements would be desirable.

BRIEF DESCRIPTION OF THE DRAWINGS

In the following detailed description of exemplary embodiments of the invention, reference is made to the accompanied drawings, which form a part hereof, and in which are shown by a way of illustration specific exemplary embodiments in which the invention may be practiced, as follows.

Figure 1:
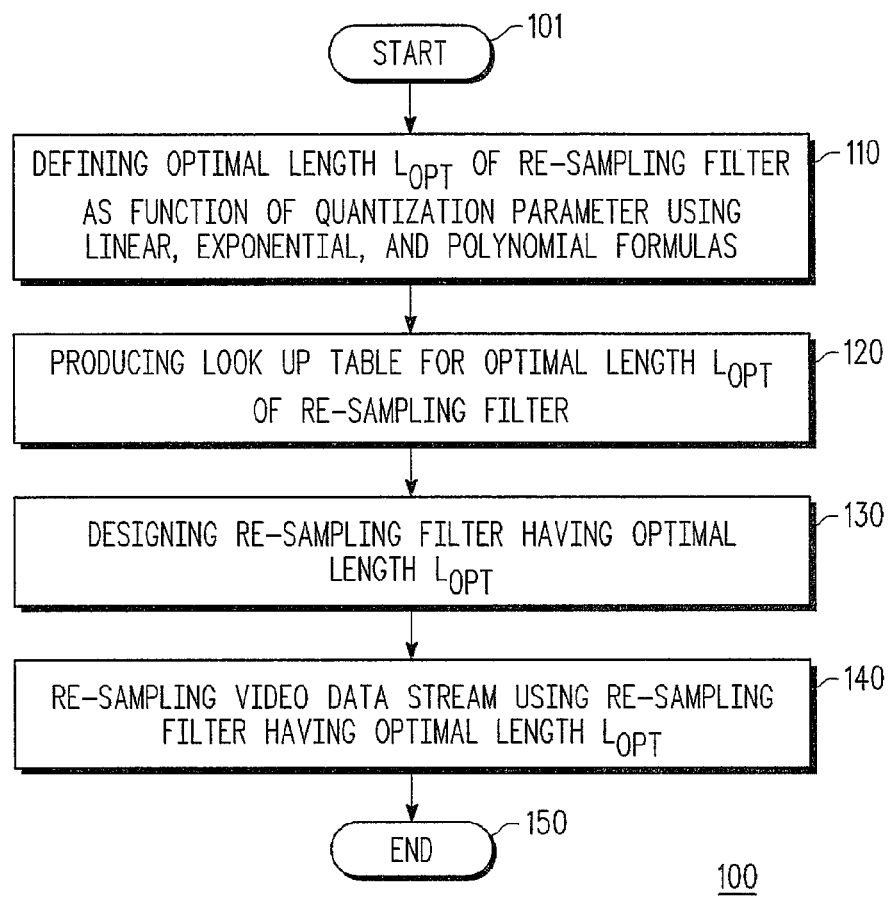
FIG. 1 is a flow diagram illustrating a method for sampling video data in accordance with one embodiment of the present invention.

To facilitate understanding, identical reference numerals have been used, where possible, to designate identical elements that are common to the figures, except that suffixes may be added, when appropriate, to differentiate such elements. The images in the drawings are simplified for illustrative purposes and are not depicted to scale. It is contemplated that features or steps of one embodiment may be beneficially incorporated in other embodiments without further recitation.

The appended drawings illustrate exemplary embodiments of the invention and, as such, should not be considered as limiting the scope of the invention that may admit to other equally effective embodiments.

DETAILED DESCRIPTION OF PREFERRED EMBODIMENTS

Figure 2:
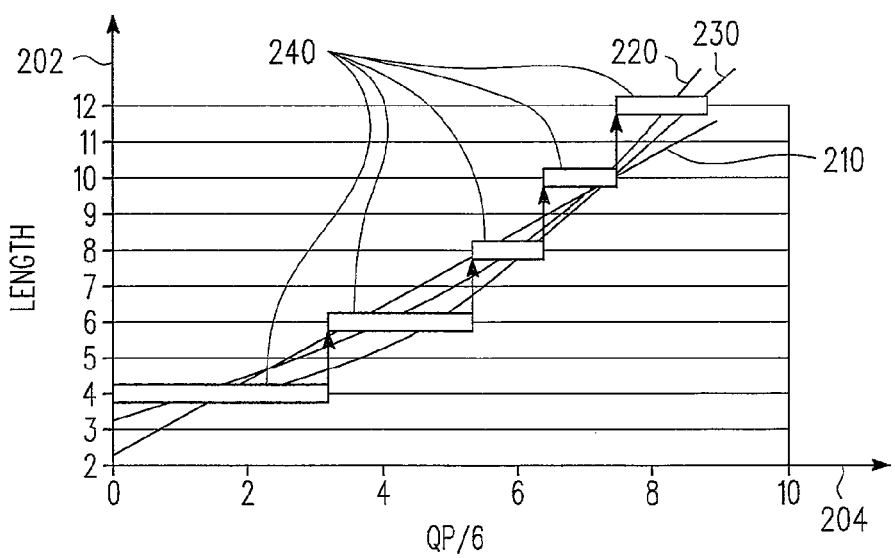
FIG. 2 shows a series of graphs illustrating dependence of an optimal length of a re-sampling filter from a quantization parameter.
Figures 3, 4:
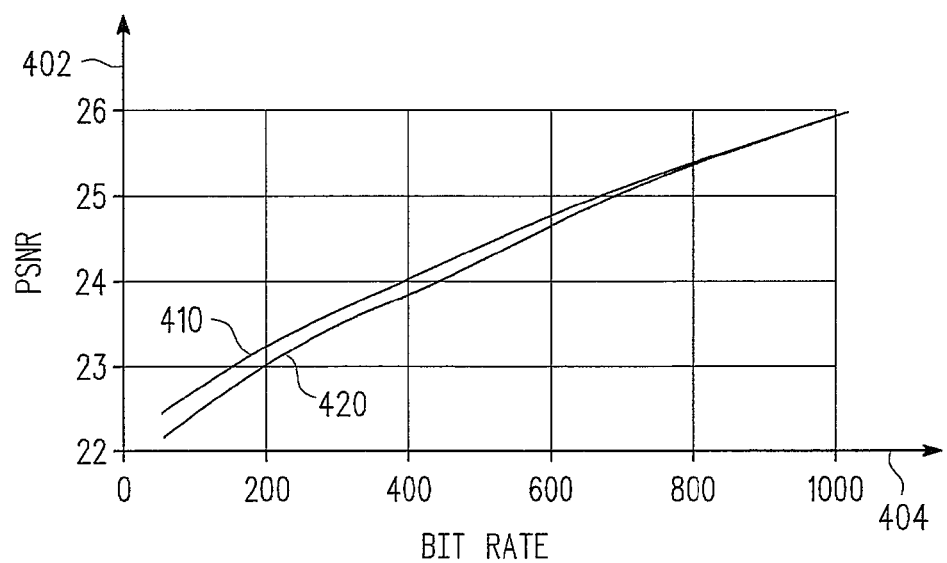
FIG. 3 shows a look up table summarizing data contained in the graphs of FIG. 2.
FIG. 4 shows a series of exemplary graphs illustrating dependence of a peak signal-to-noise ratio from a bit rate for a re-sampling filter having an optimal length and for a conventional re-sampling filter.

Referring to the figures, FIG. 1 is a flow diagram illustrating a method 100 for sampling video data in accordance with one embodiment of the present invention. FIG. 2 shows graphs illustrating dependence between an optimal length and a quantization parameter of the filter. FIG. 3 is a look up table summarizing data contained in the graphs of FIG. 2. In various embodiments, method steps of the method 100 are performed in the depicted order or at least two of these steps or portions thereof may be performed contemporaneously or in a different order.

The method 100 starts at step 101 and proceeds to step 110. At step 110, a bit rate of inputted video data (for example, data generated using a high-resolution digital video recorder, such as a television (TV) camera, or the like) and a quantization parameter (QP) are determined. A value of the quantization parameter may be selected based on requirements of quality of images in the processed (i.e., sampled) video data, specification of an end user apparatus for displaying sampled video sequences, bandwidth of a communication channel for transmitting the sampled video data, or a combination thereof.

Herein, the term "quantization parameter" refers to a measure of a compression ratio during a process of encoding the inputted video data in outputted, or re-sampled, video data, wherein the compression ratio is defined as a ratio of the bit rate of the inputted data to a bit rate of the outputted data. Accordingly, the terms "sampling" and "converting", with or without prefixes "re-", "up-" or "down-", are broadly used in reference to conversions performed upon the video data and bit rates of the processed video data.

Generally, in a re-sampling filter, video data is sampled at a macroblock level. Macroblocks (MBs) are basic building blocks of the video data, and main elements of sampling the data (i.e., prediction, block transformation, and quantization) can be performed by processing one macroblock at a time.

Using computer modeling techniques, a preferred embodiment provides that a re-sampling filter and, in particular, low-pass re-sampling filter having a specific length facilitates, in a broad range of quantization parameters, the best image quality of visual information contained in sampled (i.e., down-converted) video data. This is demonstrated in modeling techniques including, in particular, computer simulations of coding efficiency of re-sampling filters and calculations of noise components in the sampled video data. The defined specific length is referred to hereafter as an optimal length $L_{OPT}$ of the re-sampling filter and has been determined to be a function of the QP of the filter and, as such, the function of a bit rate of the inputted video data and the compression ratio. Computer modeling techniques and computer simulations are implemented in preferred embodiments by computer readable medium storing program code that, when executed by a data processor, facilitates execution of methods of preferred embodiments of the present invention.

Conventionally, a length of the re-sampling filter, and herein including the optimal length $L_{OPT}$, is measured in units of taps of the filter, where its numerical value corresponds to the highest power in a z-transform representation of the re-sampling filter. In qualitative terms, the optimal length $L_{OPT}$ is defined as a minimal length of the re-sampling filter providing that a peak signal-to-noise ratio (PSNR) of the sampled video data is equal to or exceeds a predetermined limit, $PSNR_{MIN}$.

Specifically, the optimal length $L_{OPT}$ may be calculated, with a statistic R-squared value, using at least one of the following empirical formulas for optimal length $L_{OPT}$ expressed as a function of the quantization parameter QP:

using a linear function: $L_{OPT}(QP)=1.0757(QP)+2.1205$, with $R\approx 0.8734$;    (1)

using an exponential function: $L_{OPT}(QP)= 3.1397e^{0.1575(QP)}$, with $R\approx 0.9115$; or    (2)

using an exponential function:
$L_{OPT}(QP)=0.1561(QP)^2-0.2508(QP)+3.9629$,
with $R\approx 0.9653$.    (3)

Referring to FIG. 2, graphs 210, 220, and 230 illustrate dependence of the optimal length $L_{OPT}$ (y-axis 202) on the quantization parameter QP (x-axis 204) as expressed using the empirical formulas (1), (2), and (3), respectively. A composite graph 240 summarizes the empirical formulas in the form of a tabular (i.e., discrete) approximation.

Referring back to FIG. 1, at step 120, the optimal length $L_{OPT}$ is defined using at least one, but optionally two or more in combination, of the empirical formulas (1)-(3) of the preceding step is presented in a tabular form as a look-up table (LUT), which enables implementation of the empirical formulas in the design of the respective re-sampling filters. Referring to FIG. 3, a LUT 300 contains columns 310 and 320 containing data of the corresponding composite graph 240 of FIG. 2 and establishes correlation between a value of the quantization parameter (QP) and the optimal length ($L_{OPT}$) of the re-sampling filter.

Referring back to FIG. 1, at step 130, the re-sampling filter having the optimal length ($L_{OPT}$) for sampling the inputted video data having a particular bit rate is configured using the LUT 300 of FIG. 3 (i.e., configuration and transform coefficients of the re-sampling filter are defined and programmed). The re-sampling filter is generally based on low-pass filter design procedures, for example, a window-based filter design, has the optimal length ($L_{OPT}$), and may be any kind of a digital filter, for example, a Kaiser filter, Chebyshev filter, and the like. In one embodiment, step 130 further includes determining the PSNR of the re-sampling filter. Typically, at least a portion of the re-sampling filter is implemented as a computer program, comprising computer readable medium storing program code that, when executed by a data processor, facilitates execution of the methods of preferred embodiments of the present invention.

At step 140, the re-sampling filter configured at step 130 is used for sampling the inputted video data. Parameters of the re-sampling filter are optimized relative to the bit rate of the inputted video data and the compression ratio. The re-sampling filter may be adapted for sampling video data having specific bit rates or intended for various video applications. The re-sampling filters of a preferred embodiment of the present invention convert the inputted video data and generate, in compressed formats, sequences of video images providing improved quality of recovered graphical information on displays of end users.

Upon completion of step 140, at step 150, the method 100 ends. At least some steps of the method 100 may selectively be repeated to re-configure the re-sampling filter for processing video data having different bit rates or intended for different end user systems.

In exemplary embodiments, the re-sampling filters configured using the method 100 demonstrated better performances and, in particular, higher PSNR than the fixed-length filters. In particular, referring to FIG. 4, graphs 410 and 420 illustrate dependence of the PSNR (y-axis 402) from a bit rate, in kbps, (x-axis 404) of the inputted video data for the bit-rate adaptive re-sampling filter of a preferred embodiment of the present invention (410) and a conventional 6-tap re-sampling filter (420) (in both cases, Kaiser filters).

Figure 5A:
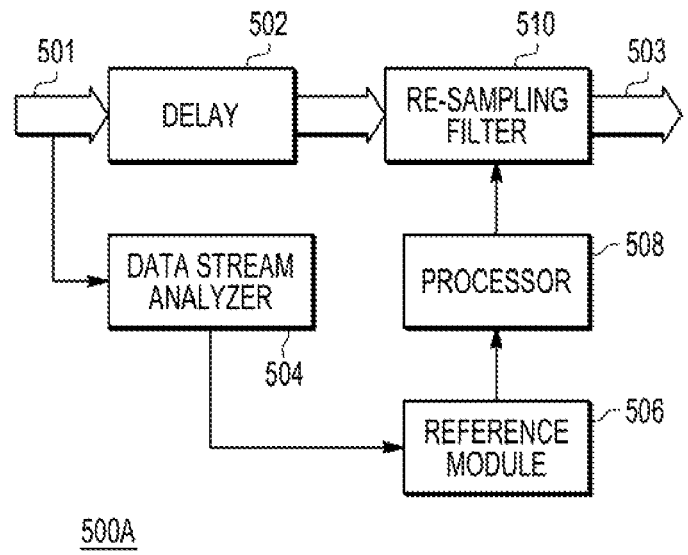
FIGS. 5A-5B are high-level, schematic block diagrams of exemplary systems for re-sampling video data in accordance with the method of FIG. 1.
Figure 5B:
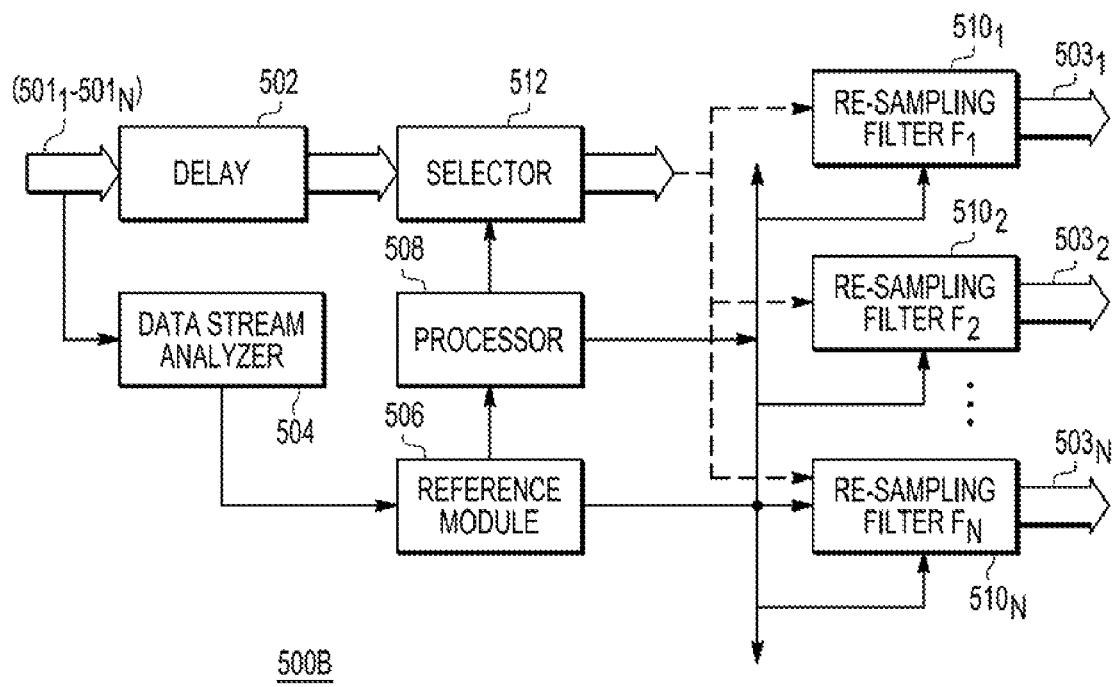

FIGS. 5A and 5B are high-level, schematic block diagrams of exemplary systems 500A and 500B, respectively, for bit-rate adaptive sampling video data in accordance with the method 100 of FIG. 1.

Referring to FIG. 5A, the system 500A generally comprises a delay module 502, a video data analyzer 504, a reference module 506, a processor 508, and a re-sampling filter 510. At least one of the modules 502 or 506, video data analyzer 504, or re-sampling filter 510 may be implemented as a computer program, programmable or non-programmable hardware, or a combination thereof. A computer program comprising computer readable medium storing program code that, when executed by a data processor, facilitates execution of the methods of preferred embodiments of the present invention.

A time delay setting of the delay module 502 is selected to be sufficient to program or configure the re-sampling filter 510 that performs pre-determined encoding of an inputted video data 501 in an output video data 503. The video data analyzer 504 determines a quantization parameter QP for the re-sampling filter 510. In one particular embodiment, the reference module 506 contains the LUT 300 discussed above in reference to FIG. 3.

Based upon the determined value of the quantization parameter QP, the reference module 506 defines and communicates to the processor 508 the optimal length $L_{OPT}$ for the re-sampling filter 510, for example, a low-pass Kaiser filter. Using the value of the optimal length $L_{OPT}$, along with other design requirements or parameters, the processor 508 defines the transfer function, configuration, and transform coefficients of the re-sampling filter 510 adapted for converting the inputted video data 501. In the re-sampling filter 510, the video data 501 is generally sampled at a macroblock level.

When a bit rate of the video data 501 is known, parameters of the re-sampling filter 510 may be defined and pre-programmed in advance using, for example, the processor 508 or a remote processor (not shown). In such embodiments (not shown), at least some of the delay module 502, reference module 506, or processor 508 are optional.

Referring to FIG. 5B, the system 500B further includes a selector 512 and a plurality of re-sampling filters $510_1$-$510_N$, wherein N is an integer and N>1. The system 500B may be used for adaptive sampling video data $501_1$-$501_N$ having different bit rates. Such video data may be inputted sequentially (as shown), or at least partially constitute time-multiplexed data (e.g., contemporaneously inputted data).

Each of the re-sampling filters $510_1$-$510_N$ has a corresponding optimal length $L_{OPT1}$-$L_{OPTN}$ that, using the LUT 300, is selected for sampling one of the video data $501_1$-$501_N$. Illustratively, design parameters of the re-sampling filters $510_1$-$510_N$ are determined using a single processor (i.e., processor 508).

In the depicted embodiment, during sampling particular video data (for example, video data $501_2$, as arbitrarily shown in FIG. 5B), the selector 512 couples an output of the delay module 502 to a re-sampling filter (e.g., re-sampling filter $510_2$) having the optimal length (i.e., $L_{OPT2}$) for sampling that video data. In general terms, the selector 512 communicatively couples the delay module 502 to the re-sampling filter which quantization parameter QP corresponds to the bit rate of the inputted video data (i.e., video data $501_2$).

In an alternate embodiment (not shown) when at least two streams of the video data $501_1$-$501_N$ are inputted contemporaneously, the selector 512 de-multiplexes and selectively directs each of the de-multiplexed streams of video data to the re-sampling filter which quantization parameter QP corresponds to the bit rate of the respective de-multiplexed data.

While the invention has been particularly shown and described with reference to preferred embodiments, it will be understood by those skilled in the art that various changes in form and detail may be made without departing from the spirit and scope of the invention. Any variations, modifications, additions, and improvements to the embodiments described are possible and may fall within the cope of the invention as detailed within the following claims.

What is claimed is:

1. A method comprising:
   (a) modeling, by a data processing system, an optimal length ($L_{OPT}$) of a re-sampling filter as a function of a quantization parameter (QP) of the re-sampling filter;
   (b) deriving, by the data processing system, empirical formulas for the optimal length using results of the step (a);
   (c) producing, by the data processing system, a look up table for the optimal length using at least one of the empirical formulas;
   (d) designing, by the data processing system, a re-sampling filter having the optimal length defined using the empirical formulas or the look up table; and
   (e) sampling video data using the re-sampling filter.

2. The method of claim 1, wherein the step (a) further comprises:
   defining the quantization parameter (QP) as a measure of a compression ratio of the re-sampling filter;
   expressing a value of the quantization parameter (QP) in units of the compression ratio;
   expressing the optimal length ($L_{OPT}$) in units of taps of the re-sampling filter; and
   defining the optimal length ($L_{OPT}$) as a minimal length providing that a peak signal-to-noise ratio (PSNR) of sampled video data is equal to or exceeds a pre-determined limit.

3. The method of claim 1, wherein the step (a) further comprises:
   determining coding efficiency of the re-sampling filter.

4. The method of claim 1, wherein the step (b) further comprises:
   deriving the empirical formulas where the optimal length $L_{OPT}$ is a function $L_{OPT}(QP)$ of the quantization parameter QP.

5. The method of claim 4, further comprising:
   deriving the empirical formulas where the optimal length $L_{OPT}$ is at least one of a linear function, an exponential function, or a polynomial function of the quantization parameter QP.

6. The method of claim 5, wherein the linear function is:

$L_{OPT}(QP)=1.0757(QP)+2.1205$, with a statistic $R$-squared value of about 0.8734.

7. The method of claim 5, wherein the exponential function is:

$L_{OPT}(QP)=3.1397e^{0.1575(QP)}$, with a statistic $R$-squared value of about 0.9115.

8. The method of claim 5, wherein the polynomial function is:

$L_{OPT}(QP)=L_{OPT}(QP)=0.1561(QP)^2-0.2508(QP)+3.9629$, with a statistic $R$-squared value of about 0.9653.

9. The method of claim 1, wherein the step (c) further comprises:
   producing the look up table where the optimal length ($L_{OPT}$) of the re-sampling filter is expressed as a function of the quantization parameter (QP) as follows:

| QUANTIZATION PARAMETER (QP) | OPTIMAL LENGTH ($L_{OPT}$) |
|---|---|
| 0-12 | 4 |
| 21-32 | 6 |
| 33-38 | 8 |
| 39-44 | 10 |
| 44-51 | 12 |

10. The method of claim 1, wherein the step (d) further comprises:
    determining the quantization parameter (QP) and a peak signal-to-noise ratio (PSNR) of the re-sampling filter.

11. The method of claim 1, wherein the re-sampling filter is a low-pass digital filter.

12. A non-transitory computer readable medium storing program code that, when executed by a data processor, facilitates execution of the method of claim 1.

13. A system for sampling video data, comprising:
    a delay module for delaying the video data;
    a bit rate analyzer for determining a quantization parameter (QP) for a re-sampling filter;
    a reference module for determining an optimal length ($L_{OPT}$) of the re-sampling filter based on the QP;
    the re-sampling filter adapted to the optimal length ($L_{OPT}$) based on a bit rate of the video data; and
    a processor, responsive to the reference module, adapted to determine transform coefficients of the re-sampling filter.

14. The system of claim 13, wherein at least one of the delay module, the bit rate analyzer, the reference module, or the re-sampling filter is implemented programmable or non-programmable hardware, or a combination thereof.

15. The system of claim 13, wherein:
    the quantization parameter (QP) is a measure of a compression ratio; and
    the optimal length ($L_{OPT}$) is a minimal length providing that a peak signal-to-noise ratio (PSNR) of the sampled video data is equal to or exceeds a pre-determined limit.

16. The system of claim 13, wherein the reference module uses at least one of empirical formulas A, B, or C to calculate the optimal length $L_{OPT}$ expressed as a function $L_{OPT}(QP)$ of the quantization parameter QP:

$$L_{OPT}(QP)=1.0757(QP)+2.1205, \text{ with a statistic } R\text{-squared value of about } 0.8734; \quad (A)$$

$$L_{OPT}(QP)=3.1397e^{0.1575(QP)}, \text{ with a statistic } R\text{-squared value of about } 0.9115; \text{ and} \quad (B)$$

$$L_{OPT}(QP)=L_{OPT}(QP)=0.1561(QP)^2-0.2508(QP)+3.9629, \text{ with a statistic } R\text{-squared value of about } 0.9653. \quad (C)$$

17. The system of claim 13, wherein the reference module contains a look up table where the optimal length ($L_{OPT}$) of the re-sampling filter is expressed as a function of the quantization parameter (QP) as follows:

| QUANTIZATION PARAMETER (QP) | OPTIMAL LENGTH ($L_{OPT}$) |
|---|---|
| 0-12 | 4 |
| 21-32 | 6 |
| 33-38 | 8 |
| 39-44 | 10 |
| 44-51 | 12 |

18. The system of claim 13, further comprising:
a plurality of re-sampling filters, wherein each re-sampling filter has the optimal length ($L_{OPT}$) for sampling video data having a particular bit rate; and
a selector directing the video data to the re-sampling filter having the optimal length ($L_{OPT}$) for sampling the video data.

19. The system of claim 18, wherein the selector de-multiplexes time-multiplexed video data having different bit rates and selectively directs the de-multiplexed video data to the re-sampling filters having the optimal lengths ($L_{OPT}$) for sampling the respective portion of the de-multiplexed video data.

20. The system of claim 13, wherein the re-sampling filter is a low-pass digital filter.

* * * * *